(12) United States Patent
Shi et al.

(10) Patent No.: US 9,739,968 B2
(45) Date of Patent: Aug. 22, 2017

(54) ACCESS TERMINAL BOX COMPONENT

(71) Applicant: Huawei Technologies Co., Ltd., Shenzhen, Guangdong (CN)

(72) Inventors: Deyi Shi, Shenzhen (CN); Yeren Wang, Shenzhen (CN); Anliang Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/082,462

(22) Filed: Mar. 28, 2016

(65) Prior Publication Data

US 2016/0327765 A1  Nov. 10, 2016

Related U.S. Application Data

(63) Continuation of application No. PCT/CN2015/078558, filed on May 8, 2015.

(51) Int. Cl.
G02B 6/00 (2006.01)
G02B 6/44 (2006.01)

(52) U.S. Cl.
CPC ................. G02B 6/4446 (2013.01)

(58) Field of Classification Search
None
See application file for complete search history.

(56) References Cited

U.S. PATENT DOCUMENTS

| 7,664,360 B2* | 2/2010 | Cox ..................... G02B 6/4439 385/134 |
| RE45,153 E * | 9/2014 | Hendrickson ........ G02B 6/4441 385/134 |
| 2004/0184745 A1 | 9/2004 | Mynatt et al. |
| 2007/0237484 A1 | 10/2007 | Reagan et al. |
| 2010/0142899 A1 | 6/2010 | Zhou et al. |
| 2012/0224823 A1 | 9/2012 | Cox et al. |

FOREIGN PATENT DOCUMENTS

| CN | 101285915 A | 10/2008 |
| CN | 101501546 A | 8/2009 |
| CN | 101840039 A | 9/2010 |
| CN | 102692689 A | 9/2012 |
| EP | 2 045 636 A1 | 4/2009 |
| EP | 2 674 800 A2 | 12/2013 |

* cited by examiner

Primary Examiner — Hemang Sanghavi

(57) ABSTRACT

The present invention provides an access terminal box component, including a mounting plate and a fiber optic terminal base, where the fiber optic terminal base is mounted on the mounting plate; the fiber optic terminal base is configured to carry a fiber; the mounting plate is configured to mount the fiber optic terminal base on a preset position; a first locking slot and a second locking slot that are arranged opposite to each other are disposed on the mounting plate; a first locking hook is arranged at a position that is corresponding to the first locking slot and on the fiber optic terminal base, so as to be connected to the first locking slot by means of locking. The present invention improves detaching efficiency, and avoids damage to a part and a fiber on the fiber optic terminal base.

10 Claims, 3 Drawing Sheets

US 9,739,968 B2

ACCESS TERMINAL BOX COMPONENT

CROSS REFERENCE TO RELATED APPLICATIONS

This application is a continuation of International Application No. PCT/CN2015/078558, filed on May 8, 2015, which is hereby incorporated by reference in its entirety.

TECHNICAL FIELD

The present invention relates to the field of communications technologies, and in particular, to an access terminal box component.

BACKGROUND

A mounting plate of an access terminal box is a mounting accessory of the access terminal box and has a wide range of application scenarios. The mounting plate is configured to be assembled on the access terminal box, so as to mount the access terminal box on a specified position. The mounting plate may support wall-hung mounting, in-wall mounting, and dedicated slide mounting in a cabinet or a chassis, and may also support mounting by directly attaching the mounting plate to a wall by using an adhesive tape. Specifically, when the access terminal box is being mounted, it is required to first fasten the access terminal box on the mounting plate and then fasten the mounting plate on a specified position. However, when it is required to detach the access terminal box from the mounting plate, it is required to manually separate a mounting member on a base of the access terminal box. As a result, a detaching operation is inconvenient, and when a separating force is too large, damage is caused to a part on the base of the access terminal box. In addition, because a large quantity of fibers are coiled on the base of the access terminal box, when the separating force is too large during detachment, a fiber may be touched, which causes damage to the fiber.

SUMMARY

Embodiments of the present invention provide an access terminal box component, which is configured to implement simple and convenient detachment of an access terminal box from a mounting plate and can avoid causing damage to a part and a fiber on a fiber optic terminal base.

According to a first aspect, an access terminal box component is provided and includes a mounting plate and a fiber optic terminal base, where the fiber optic terminal base is mounted on the mounting plate; the fiber optic terminal base is configured to carry a fiber; the mounting plate is configured to mount the fiber optic terminal base on a preset position; a first locking slot and a second locking slot are disposed on the mounting plate, where the first locking slot and the second locking slot are arranged opposite to each other; a first locking hook is arranged at a position that is corresponding to the first locking slot and on the fiber optic terminal base, so as to be connected to the first locking slot by means of locking; a second locking hook is arranged at a position that is corresponding to the second locking slot and on the fiber optic terminal base, so as to be connected to the second locking slot by means of locking; a first pressing part and a second pressing part are further arranged on the fiber optic terminal base, where the first pressing part is connected to the first locking hook, and the second pressing part is connected to the second locking hook; and locking between the first locking hook and the first locking slot and locking between the second locking hook and the second locking slot are respectively released by operating the first pressing part and the second pressing part, so as to detach the fiber optic terminal base from the mounting plate.

In a first possible implementation manner of the first aspect, both the first locking slot and second locking slot are through slots; the first locking hook and the second locking hook respectively include a guiding part and a hooking part that are formed by bending a bottom of the guiding part; and when the first locking hook and the second locking hook are respectively connected to the first locking slot and the second locking slot by means of locking, the guiding part of the first locking hook and the guiding part of the second locking hook are respectively accommodated inside the first locking slot and the second locking slot, and the hooking part of the first locking hook and the hooking part of the second locking hook respectively pass through the first locking slot and the second locking slot and abut against a bottom of the mounting plate.

In a second possible implementation manner of the first aspect, both the first locking slot and the second locking slot are blind slots; the first locking slot and the second locking slot respectively include an accommodating groove and an engaging groove that are connected to a bottom of the accommodating groove, and the accommodating groove penetrates a top of the mounting plate; the first locking hook and the second locking hook respectively include a guiding part and a hooking part that are formed by bending a bottom of the guiding part; and when the first locking hook and the second locking hook are respectively connected to the first locking slot and the second locking slot by means of locking, the guiding part of the first locking hook and the guiding part of the second locking hook are respectively accommodated inside the corresponding accommodating grooves, and the hooking part of the first locking hook and the hooking part of the second locking hook are respectively accommodated inside the corresponding engaging grooves and lock the corresponding engaging grooves.

In a third possible implementation manner of the first aspect, or with reference to the first or the second possible implementation manner of the first aspect, in a third possible implementation manner, the mounting plate includes a first side end and a second side end that are arranged opposite to each other, the first locking slot is disposed at the first side end and penetrates a top of the first side end, and the second locking slot is arranged on the second side end and penetrates a top of the second side end; and the fiber optic terminal base includes a first side end face and a second side end face that are arranged opposite to each other, the first side end face is corresponding to the first side, the second side end face is corresponding to the second side, the first pressing part is arranged on the first side end face, the first locking hook is arranged on a bottom surface of the first pressing part, so as to be connected to the first locking slot by means of locking, the second pressing part is arranged on the second side end face, and the second locking hook is arranged on a bottom surface of the second pressing part, so as to be connected to the second locking slot by means of locking.

With reference to the third possible implementation manner of the first aspect, in a fourth possible implementation manner, the mounting plate further includes a third side end and a fourth side end that are arranged opposite to each other, two ends of the third side end are respectively connected to a first end of the first side end and a first end of the second side end, and two ends of the fourth side end are respectively connected to a second end of the first side end and a second end of the second side end; a third locking slot is disposed at the third side end, and the third locking slot penetrates a top of the third side end, so as to be connected to the first locking hook by means of locking; and a fourth locking slot is disposed at the fourth side end, and the fourth locking slot penetrates a top of the fourth side end, so as to be connected to the second locking hook by means of locking.

With reference to the fourth possible implementation manner of the first aspect, in a fifth possible implementation manner, both the third locking slot and the fourth locking slot are through slots; and when the first locking hook and the second locking hook are respectively connected to the third locking slot and the fourth locking slot by means of locking, the guiding part of the first locking hook and the guiding part of the second locking hook are respectively accommodated inside the third locking slot and the fourth locking slot, and the hooking part of the first locking hook and the hooking part of the second locking hook respectively pass through the third locking slot and the fourth locking slot and abut against the bottom of the mounting plate.

With reference to the fourth possible implementation manner of the first aspect, in a sixth possible implementation manner, both the third locking slot and the fourth locking slot are blind slots; the third locking slot and the fourth locking slot respectively include an accommodating groove and an engaging groove that are connected to a bottom of the accommodating groove; the accommodating groove penetrates the top of the mounting plate; and when the first locking hook and the second locking hook are respectively connected to the third locking slot and the fourth locking slot by means of locking, the guiding part of the first locking hook and the guiding part of the second locking hook are respectively accommodated inside the corresponding accommodating grooves, and the hooking part of the first locking hook and the hooking part of the second locking hook are respectively accommodated inside the corresponding engaging grooves and lock the corresponding engaging grooves.

With reference to the fourth possible implementation manner of the first aspect, in a seventh possible implementation manner, a first locking member is disposed at a position that is corresponding to the third locking slot and on the fiber optic terminal base, so as to be connected to the third locking slot by means of locking; and a second locking member is disposed at a position that is corresponding to the fourth locking slot and on the fiber optic terminal base, so as to be connected to the fourth locking slot by means of locking.

With reference to any one of the fourth to the seventh possible implementation manners of the first aspect, in an eighth possible implementation manner, a shape of the mounting plate is the same as a shape of the fiber optic terminal base, and the mounting plate and the fiber optic terminal base are symmetrical according to a same axis center.

In a ninth possible implementation manner of the first aspect, or with reference to any one of the first to the eighth possible implementation manners of the first aspect, in a ninth possible implementation manner, the access terminal box component further includes a cover body; the cover body is configured to cover the fiber optic terminal base; the cover body includes a first side wall and a second side wall that are arranged opposite to each other, where a first accommodating notch corresponding to the first pressing part is formed on the first side wall, and a second accommodating notch corresponding to the second pressing part is formed on the second side wall; and when the cover body covers the fiber optic terminal base, the first pressing part is accommodated inside the first accommodating notch, an end face of the first pressing part is exposed to the outside, the second pressing part is accommodated inside the second accommodating notch, and an end face of the second pressing part is exposed to the outside.

The present invention provides an access terminal box component, including a mounting plate and a fiber optic terminal base, where the fiber optic terminal base is mounted on the mounting plate; the fiber optic terminal base is configured to carry a fiber; the mounting plate is configured to mount the fiber optic terminal base on a preset position; a first locking slot and a second locking slot are disposed on the mounting plate, where the first locking slot and the second locking slot are arranged opposite to each other; a first locking hook is arranged at a position that is corresponding to the first locking slot and on the fiber optic terminal base, so as to be connected to the first locking slot by means of locking; a second locking hook is arranged at a position that is corresponding to the second locking slot and on the fiber optic terminal base, so as to be connected to the second locking slot by means of locking; a first pressing part and a second pressing part are further arranged on the fiber optic terminal base, where the first pressing part is connected to the first locking hook, and the second pressing part is connected to the second locking hook; and locking between the first locking hook and the first locking slot and locking between the second locking hook and the second locking slot are respectively released by operating the first pressing part and the second pressing part, so as to detach the fiber optic terminal base from the mounting plate. Therefore, such a detaching manner is simple and convenient, improves detaching efficiency, and it is not required to touch a part and a fiber on the fiber optic terminal base, so that no damage is caused to the part and the fiber on the fiber optic terminal base.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can, for example, be implemented in orders except the order illustrated or described herein. In addition, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The following makes detailed descriptions by using specific embodiments.

Figure 1:
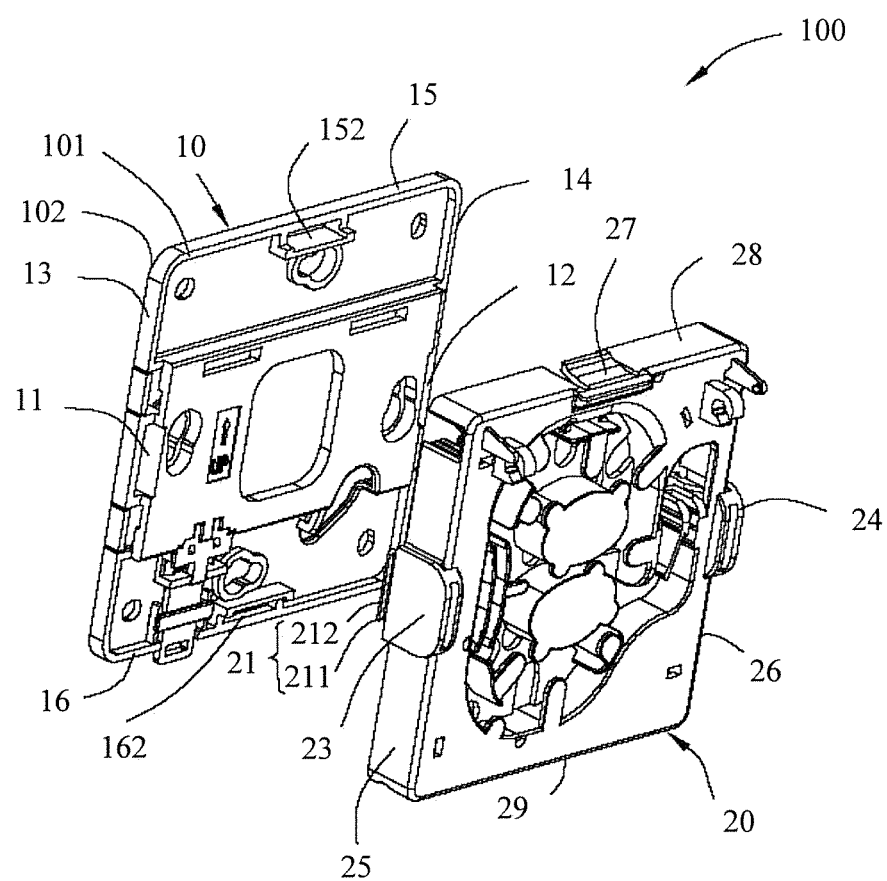
FIG. 1 is an exploded diagram of an access terminal box component according to Embodiment 1 of the present invention.
Figure 2:
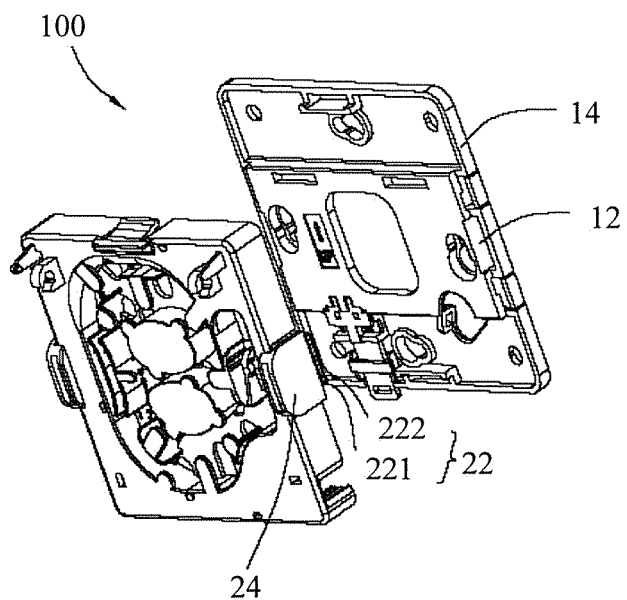
FIG. 2 is an exploded diagram of an access terminal box component in another direction according to Embodiment 1 of the present invention.

Referring to FIG. 1, FIG. 1 is an exploded diagram of an access terminal box component 100 according to Embodiment 1 of the present invention. The access terminal box component 100 includes a mounting plate 10 and a fiber optic terminal base 20. The fiber optic terminal base 20 is mounted on the mounting plate 10. The fiber optic terminal base 20 is configured to carry a fiber. The mounting plate 10 is configured to mount the fiber optic terminal base 20 on a preset position. A first locking slot 11 and a second locking slot 12 are disposed on the mounting plate 10. The first locking slot 11 and the second locking slot 12 are arranged opposite to each other. A first locking hook 21 is arranged at a position that is corresponding to the first locking slot 11 and on the fiber optic terminal base 20, so as to be connected to the first locking slot 11 by means of locking. A second locking hook 22 is arranged at a position that is corresponding to the second locking slot 12 and on the fiber optic terminal base 20, so as to be connected to the second locking slot 12 by means of locking. A first pressing part 23 and a second pressing part 24 are further arranged on the fiber optic terminal base 20. The first pressing part 23 is connected to the first locking hook 21. The second pressing part 24 is connected to the second locking hook 22. Locking between the first locking hook 21 and the first locking slot 11 and locking between the second locking hook 22 and the second locking slot 12 are respectively released by operating the first pressing part 23 and the second pressing part 24, so as to detach the fiber optic terminal base 20 from the mounting plate 10.

It should be noted that, the preset position may be a specified position on a wall, inside a cabinet or a chassis, or the like. A mounting manner may be hanging the mounting plate 10 on the wall, or arranging the mounting plate 10 on a slide of the cabinet or the chassis, so as to hang the fiber optic terminal base 20 on the wall or inside the cabinet or the chassis. Certainly, the mounting plate 10 may also be arranged at another position as required.

When the fiber optic terminal base 20 is mounted on the mounting plate 10, the first locking hook 21 is inserted into the first locking slot 11, and the second locking hook 22 is inserted into the second locking slot 12; then, the first locking hook 21 is connected to the first locking slot 21 by means of locking, and the second locking hook 22 is connected to the second locking slot 12 by means of locking, so as to implement mounting of the fiber optic terminal base 20 on the mounting plate. When it is required to detach the fiber optic terminal base 20 from the mounting plate 10, the first pressing part 23 and the second pressing part 24 deform toward each other by pressing the first pressing part 23 and the second pressing part 24 at the same time, so as to drive the first locking hook 21 and the second locking hook 22 to be unlocked respectively from the corresponding first locking slot 11 and second locking slot 12, and the fiber optic terminal base 20 can be detached from the mounting plate 10 by exerting a pulling force on the first pressing part 23 and the second pressing part 24 at the same time.

Therefore, in this embodiment, the first locking slot 11 and the second locking slot 12 are disposed on the mounting plate 10. The first locking slot 11 and the second locking slot 12 are arranged opposite to each other. The first locking hook 21 is arranged at the position that is corresponding to the first locking slot 11 and on the fiber optic terminal base 20, so as to be connected to the first locking slot 11 by means of locking. The second locking hook 22 is arranged at the position that is corresponding to the second locking slot 12 and on the fiber optic terminal base 20, so as to be connected to the second locking slot 12 by means of locking. The first pressing part 23 and the second pressing part 24 are further arranged on the fiber optic terminal base 20. The first pressing part 23 is connected to the first locking hook 21. The second pressing part 24 is connected to the second locking hook 22. The locking between the first locking hook 21 and the first locking slot 11 and the locking between the second locking hook 22 and the second locking slot 12 are respectively released by operating the first pressing part 23 and the second pressing part 24, so as to detach the fiber optic terminal base 20 from the mounting plate 10. Therefore, such a detaching manner is simple and convenient, improves detaching efficiency, and it is not required to touch a part and a fiber on the fiber optic terminal base 20, so that no damage is caused to the part and the fiber on the fiber optic terminal base 20.

In this embodiment, both the first locking slot 11 and the second locking slot 12 are blind slots. The first locking slot 11 and the second locking slot 12 respectively include an accommodating groove and an engaging groove that are connected to a bottom of the accommodating groove. The accommodating groove penetrates a top 101 of the mounting plate 10. The first locking hook 21 and the second locking hook 22 include respective guiding parts 211 and 221 and respective hooking parts 212 and 222 that are formed by bending bottoms of the guiding parts 211 and 221. When the first locking hook 21 and the second locking hook 22 are respectively connected to the first locking slot 11 and the second locking slot 12 by means of locking, the guiding part 211 of the first locking hook 21 and the guiding part 221 of the second locking hook 22 are respectively accommodated inside the corresponding accommodating grooves, and the hooking part 212 of the first locking hook 21 and the hooking part 222 of the second locking hook 22 are respectively accommodated inside the corresponding engaging grooves and lock the corresponding engaging grooves.

It should be noted that, both the first locking slot 11 and the second locking slot 12 are blind slots, that is, the first locking slot 11 and the second locking slot 12 penetrate only the top 101 of the mounting plate 10, and do not penetrate a bottom 102 of the mounting plate 10.

Specifically, the mounting plate 10 includes a first side end 13 and a second side end 14 that are arranged opposite to each other. The first locking slot 11 is disposed at the first side end 13 and penetrates a top of the first side end 13. The second locking slot 12 is disposed at the second side end 14 and penetrates a top of the second side end 14. The fiber optic terminal base 20 includes a first side end face 25 and a second side end face 26 that are arranged opposite to each other. The first side end face 25 is corresponding to the first side end 13. The second side end face 26 is corresponding to the second side end 14. The first pressing part 23 is arranged on the first side end face 25. The first locking hook 21 is arranged on a bottom surface of the first pressing part 23, so as to be connected to the first locking slot 11 by means of locking. The second pressing part 24 is arranged on the second side end face 26. The second locking hook 22 is arranged on a bottom surface of the second pressing part 24, so as to be connected to the second locking slot 12 by means of locking.

It should be noted that, the top of the first side end 13 and the top of the second side end 14 are the top 101 of the mounting plate 10.

In this embodiment, both the first locking slot 11 and the second locking slot 12 are ⊢-shaped. An included angle between the accommodating groove and the engaging groove is less than or equal to 90 degrees. A distance between the engaging groove of the first locking slot 11 and the engaging groove of the second locking slot 12 is less than a distance between the accommodating groove of the first locking slot 11 and the accommodating groove of the second locking slot 12. The hooking part 212 of the first locking hook 21 is formed by bending the guiding part 211 toward the second locking hook 22, so as to be corresponding to the engaging groove of the first locking slot 11. The hooking part 222 of the second locking hook 22 is formed by bending the guiding part 221 toward the first locking hook 21, so as to be corresponding to the engaging groove of the second locking slot 12. When it is required to detach the fiber optic terminal base 20 from the mounting plate 10, by pressing a top of the first pressing part 23 and a top of the second pressing part 24, the first pressing part 23 and the second pressing part 24 deform toward each other, to drive the hooking part 212 of the first locking hook 21 and the hooking part 222 of the second locking hook 22 to respectively move in directions away from each other, so that the hooking part 212 of the first locking hook 21 and the hooking part 222 of the second locking hook 22 detach from the corresponding engaging grooves. Then, a pulling force is exerted on the first pressing part 23 and the second pressing part 24, so that the fiber optic terminal base 20 can be detached from the mounting plate 10.

Certainly, in another embodiment, both the first locking slot 11 and the second locking slot 12 may also be ⊣-shaped. An included angle between the accommodating groove and the engaging groove is less than or equal to 90 degrees. A distance between the engaging groove of the first locking slot 11 and the engaging groove of the second locking slot 12 is greater than a distance between the accommodating groove of the first locking slot 11 and the accommodating groove of the second locking slot 12. The hooking part 212 of the first locking hook 21 is formed by bending the guiding part 211 toward a direction away from the second locking hook 22, so as to be corresponding to the engaging groove of the first locking slot 11. The hooking part 222 of the second locking hook 22 is formed by bending the guiding part 221 toward a direction away from the first locking hook 21, so as to be corresponding to the engaging groove of the second locking slot 12. When it is required to detach the fiber optic terminal base 20 from the mounting plate 10, by pressing the first pressing part 23 and the second pressing part 24, the first pressing part 23 and the second pressing part 24 deform toward each other, to drive the hooking part 212 of the first locking hook 21 and the hooking part 222 of the second locking hook 22 to also move toward each other, so that the hooking part 212 of the first locking hook 21 and the hooking part 222 of the second locking hook 22 detach from the corresponding engaging grooves. Then, a pulling force is exerted on the first pressing part 23 and the second pressing part 24, so that the fiber optic terminal base 20 can be detached from the mounting plate 10.

In another embodiment, both the first locking slot 11 and the second locking slot 12 may also be through slots. When the first locking hook 21 and the second locking hook 22 are respectively connected to the first locking slot 11 and the second locking slot 12 by means of locking, the guiding part 211 of the first locking hook 21 and the guiding part 221 of the second locking hook 22 are respectively accommodated inside the first locking slot 11 and the second locking slot 12, and the hooking part 212 of the first locking hook 21 and the hooking part 222 of the second locking hook 22 respectively pass through the first locking slot 11 and the second locking slot 12 and lock and abut against the bottom 102 of the mounting plate 10.

It should be noted that, both the first locking slot 11 and the second locking slot 12 are through slots, that is, the first locking slot 11 and the second locking slot 12 penetrate the top 101 and the bottom 102 of the mounting plate 10.

Further, the mounting plate 10 further includes a third side end 15 and a fourth side end 16 that are arranged opposite to each other. Two ends of the third side end 15 are respectively connected to a first end of the first side end 13 and a first end of the second side end 14. Two ends of the fourth side end 16 are respectively connected to a second end of the first side end 13 and a second end of the second side end 14. A third locking slot 152 is disposed at the third side end 15. The third locking slot 152 penetrates a top of the third side end 15, so as to be connected to the first locking hook 21 by means of locking. A fourth locking slot 162 is disposed at the fourth side end 16. The fourth locking slot 162 penetrates a top of the fourth side end 16, so as to be connected to the second locking hook 22 by means of locking.

It should be noted that, the top of the third side end 15 and the top of the fourth side end 16 are the top 101 of the mounting plate 10. In this embodiment, the third locking slot 152 and the fourth locking slot 162 are respectively disposed at the third side end 15 and the fourth side end 16, so as to be respectively connected to the first locking hook 21 and the second locking hook 22 by means of locking, so that the first locking hook 21 and the second locking hook 22 can be not only connected to the first locking slot 11 and the second locking slot 12 by means of locking, but can be also connected to the third locking slot 152 and the fourth locking slot 162 by means of locking, which implements that the fiber optic terminal base 20 is mounted, with rotation of 90 degrees, on the mounting plate 10, and further increases variety for mounting the fiber optic terminal base 20 to meet multiple mounting requirements of a user.

In this implementation manner, both the third locking slot 152 and the fourth locking slot 162 are blind slots. Structures of the third locking slot 152 and the fourth locking slot 162 are the same as structures of the first locking slot 11 and the second locking slot 12. That is, the third locking slot 152 and the fourth locking slot 162 respectively include an accommodating groove and an engaging groove that are connected to a bottom of the accommodating groove. The accommodating groove penetrates the top 101 of the mounting plate 10. When the first locking hook 21 and the second locking hook 22 are respectively connected to the third locking slot 152 and the fourth locking slot 162 by means of locking, the guiding part 211 of the first locking hook 21 and the guiding part 221 of the second locking hook 22 are respectively accommodated inside the corresponding accommodating grooves, and the hooking part 212 of the first locking hook 21 and the hooking part 222 of the second locking hook 22 are respectively accommodated inside the corresponding engaging grooves and lock the corresponding engaging grooves.

In this embodiment, both the third locking slot 152 and the fourth locking slot 162 are ⊢-shaped, and an included angle between the accommodating groove and the engaging groove is less than or equal to 90 degrees. A distance between the engaging groove of the third locking slot 152 and the engaging groove of the fourth locking slot 162 is less than a distance between the accommodating groove of the third locking slot 152 and the accommodating groove of the fourth locking slot 162, so that the engaging groove of the third locking slot 152 can lock the hooking part 212 of the first locking hook 21 and the engaging groove of the fourth locking slot 162 can lock the hooking part 222 of the second locking hook 22.

Certainly, in another embodiment, both the third locking slot 152 and the fourth locking slot 162 may also be ⌐-shaped. An included angle between the accommodating groove and the engaging groove is less than or equal to 90 degrees. A distance between the engaging groove of the third locking slot 152 and the engaging groove of the fourth locking slot 162 is greater than a distance between the accommodating groove of the third locking slot 152 and the accommodating groove of the fourth locking slot 162, so that the engaging groove of the third locking slot 152 can lock the hooking part 212 of the first locking hook 21 and the engaging groove of the fourth locking slot 162 lock the hooking part 222 of the second locking hook 22.

Certainly, in another embodiment, both the third locking slot 152 and the fourth locking slot 162 are through slots. When the first locking hook 21 and the second locking hook 22 are respectively connected to the third locking slot 152 and the fourth locking slot 162 by means of locking, the guiding part 211 of the first locking hook 21 and the guiding part 221 of the second locking hook 22 are respectively accommodated inside the third locking slot 152 and the fourth locking slot 162, and the hooking part 212 of the first locking hook 21 and the hooking part 222 of the second locking hook 22 respectively pass through the third locking slot 152 and the fourth locking slot 162 and lock and abut against the bottom 102 of the mounting plate 10.

Further, a first locking member 27 is arranged at a position that is corresponding to the third locking slot 152 and on the fiber optic terminal base 20, so as to be connected to the third locking slot 152 by means of locking. A second locking member (not shown) is arranged at a position that is corresponding to the fourth locking slot 162 and on the fiber optic terminal base 20, so as to be connected to the fourth locking slot 162 by means of locking.

Specifically, the fiber optic terminal base 20 includes a third side end face 28 and a fourth side end face 29 that are arranged opposite to each other. Two ends of the third side end face 28 are respectively connected to a first end of the first side end face 25 and a first end of the second side end face 26. Two ends of the third end face 29 are respectively connected to a second end of the first side end face 25 and a second end of the second side end face 26. The first locking member 27 is arranged on the third side end face 28. The second locking member is arranged on the fourth side end face 29.

It should be noted that, when the first locking hook 21 and the second locking hook 22 are respectively connected to the first locking slot 11 and the second locking slot 12 by means of locking, so as to mount the fiber optic terminal base 20 on the mounting plate 10, the first locking member 27 and the second locking member are respectively connected to the third locking slot 152 and the fourth locking slot 162 by means of locking, so that the fiber optic terminal base 20 is more securely mounted on the mounting plate 10.

Certainly, when the fiber optic terminal base 20 is rotated by 90 degrees and then mounted on the mounting plate 10, the first locking hook 21 and the third locking slot 152 are connected by means of locking, the second locking hook 22 and the fourth locking slot 162 are connected by means of locking, the first locking member 27 and the first locking slot 11 are connected by means of locking, and the second locking member and the second locking slot 12 are connected by means of locking.

In this embodiment, a shape of the mounting plate 10 is the same as a shape of the fiber optic terminal base 20, and the mounting plate 10 and the fiber optic terminal base 20 are symmetrical according to a same axis center. Specifically, both the mounting plate 10 and the fiber optic terminal base 20 are squares, and the first to the fourth locking slots 11, 12, 152, and 162 are respectively arranged at middle positions of the first to the fourth side ends 13 to 16.

Figure 3:
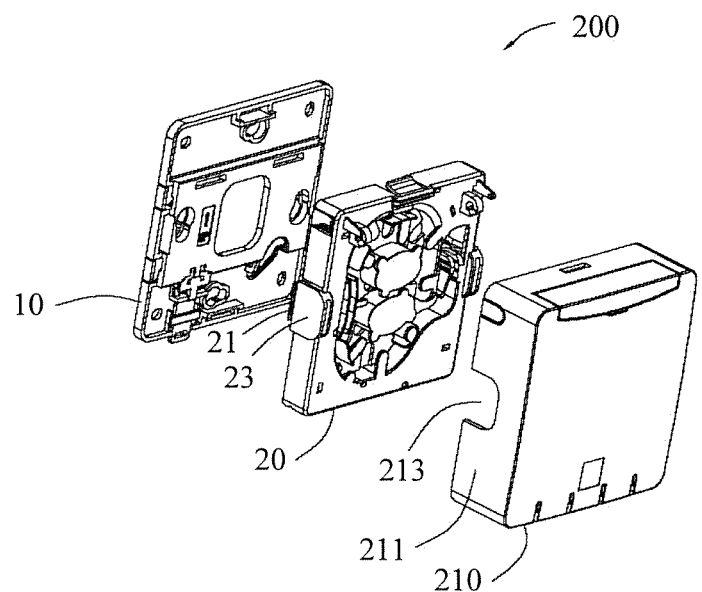
FIG. 3 is an exploded diagram of an access terminal box component according to Embodiment 2 of the present invention.
Figure 4:
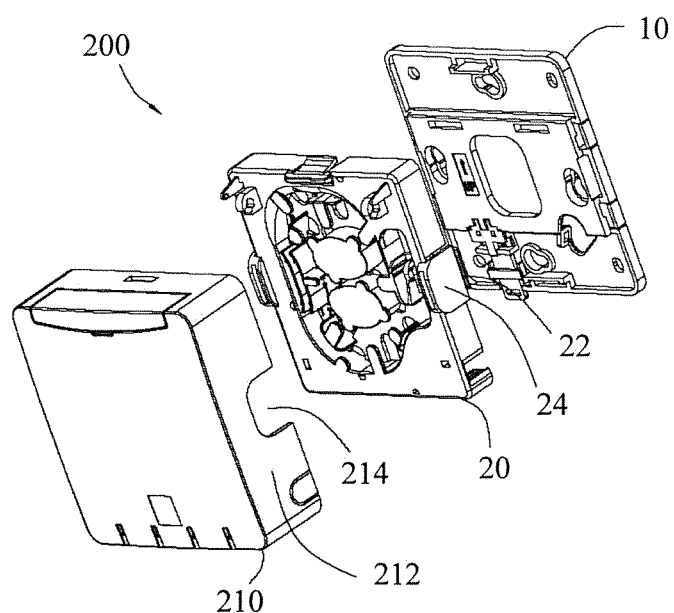
FIG. 4 is an exploded diagram of an access terminal box component in another direction according to Embodiment 2 of the present invention.

Further referring to FIG. 3, FIG. 3 is an exploded diagram of an access terminal box component 200 according to Embodiment 2 of the present invention. The access terminal box component 200 provided in Embodiment 2 is similar to the access terminal box component 100 provided in Embodiment 1, and a difference between the two lies in that, in Embodiment 2, the access terminal box component 200 further includes a cover body 210. The cover body 210 is configured to cover the fiber optic terminal base 20. The cover body 210 includes a first side wall 211 and a second side wall 212 that are arranged opposite to each other. A first accommodating notch 213 corresponding to the first pressing part 23 is formed on the first side wall 211. A second accommodating notch 214 corresponding to the second pressing part 24 is formed on the second side wall 212. When the cover body 210 covers the fiber optic terminal base 20, the first pressing part 23 is accommodated inside the first accommodating notch 213, an end face of the first pressing part 23 is exposed to the outside, the second pressing part 24 is accommodated inside the second accommodating notch 214, and an end face of the second pressing part 24 is exposed to the outside.

It should be noted that, when the cover body 210 covers the fiber optic terminal base 20, the first pressing part 23 is accommodated inside the first accommodating notch 213, the end face of the first pressing part 23 is exposed to the outside, the second pressing part 24 is accommodated inside the second accommodating notch 214, and the end face of the second pressing part 24 is exposed to the outside, so as to help an operator press the first pressing part 23 and the second pressing part 24 by directly contacting the first pressing part 23 and the second pressing part 24, so that the first pressing part 23 and the second pressing part 24 deform to drive the hooking part of the first locking hook 21 and the hooking part of the second locking hook 22 to respectively detach from the corresponding engaging grooves. Therefore, functions of the first accommodating notch 213 and the second accommodating notch 214 are helping the operator conveniently perform a pressing operation on the first pressing part 23 and the second pressing part 24.

Further, the end face of the first pressing part 23 and an outer surface of the first side end face 25 are on a same plane. The end face of the second pressing part 24 and an outer surface of the second side end face 26 are on a same plane. When the fiber optic terminal base 20 is mounted on the mounting plate 10 and the cover body 210 covers the fiber optic terminal base 20, a surface of each side of the mounting plate 10, an outer surface of a corresponding end face of the cover body 210, and an end face of a corresponding pressing part are all on a same plane. Therefore, the access terminal box component 200 has no irregular edges, so that space for mounting the access terminal box 200 is reduced.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that the descriptions are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An access terminal box component, comprising:
    a mounting plate and a fiber optic terminal base, wherein the fiber optic terminal base is mounted on the mounting plate, the fiber optic terminal base is configured to carry a fiber, and the mounting plate is configured to mount the fiber optic terminal base on a preset position;
    a first locking slot and a second locking slot disposed on the mounting plate, wherein the first locking slot and the second locking slot are arranged opposite to each other;
    a first locking hook arranged at a position corresponding to the first locking slot and on the fiber optic terminal base, so as to be connected to the first locking slot by means of locking;
    a second locking hook arranged at a position corresponding to the second locking slot and on the fiber optic terminal base, so as to be connected to the second locking slot by means of locking;
    a first pressing part and a second pressing part arranged on the fiber optic terminal base, wherein the first pressing part is connected to the first locking hook, and the second pressing part is connected to the second locking hook; and
    wherein locking between the first locking hook and the first locking slot and locking between the second locking hook and the second locking slot are respectively released by operating the first pressing part and the second pressing part, so as to detach the fiber optic terminal base from the mounting plate.

2. The access terminal box component according to claim 1, wherein:
    both the first locking slot and second locking slot are through slots;
    the first locking hook and the second locking hook respectively comprise a guiding part and a hooking part that are formed by bending a bottom of the guiding part; and
    when the first locking hook and the second locking hook are respectively connected to the first locking slot and the second locking slot by means of locking, the guiding part of the first locking hook and the guiding part of the second locking hook are respectively accommodated inside the first locking slot and the second locking slot, and the hooking part of the first locking hook and the hooking part of the second locking hook respectively pass through the first locking slot and the second locking slot and abut against a bottom of the mounting plate.

3. The access terminal box component according to claim 1, wherein:
    both the first locking slot and the second locking slot are blind slots;
    the first locking slot and the second locking slot respectively comprise an accommodating groove and an engaging groove that are connected to a bottom of the accommodating groove, and the accommodating groove penetrates a top of the mounting plate;
    the first locking hook and the second locking hook respectively comprise a guiding part and a hooking part that are formed by bending a bottom of the guiding part; and
    when the first locking hook and the second locking hook are respectively connected to the first locking slot and the second locking slot by means of locking, the guiding part of the first locking hook and the guiding part of the second locking hook are respectively accommodated inside the corresponding accommodating grooves, and the hooking part of the first locking hook and the hooking part of the second locking hook are respectively accommodated inside the corresponding engaging grooves and lock the corresponding engaging grooves.

4. The access terminal box component according to claim 1, wherein:
    the mounting plate comprises a first side end and a second side end arranged opposite to each other, wherein the first locking slot is disposed at the first side end and penetrates a top of the first side end, and the second locking slot is arranged on the second side end and penetrates a top of the second side end; and
    the fiber optic terminal base comprises a first side end face and a second side end face that are arranged opposite to each other, the first side end face is corresponding to the first side, the second side end face is corresponding to the second side, the first pressing part is arranged on the first side end face, the first locking hook is arranged on a bottom surface of the first pressing part, so as to be connected to the first locking slot by means of locking, the second pressing part is arranged on the second side end face, and the second locking hook is arranged on a bottom surface of the second pressing part, so as to be connected to the second locking slot by means of locking.

5. The access terminal box component according to claim 4, wherein:
    the mounting plate further comprises a third side end and a fourth side end arranged opposite to each other, wherein two ends of the third side end are respectively connected to a first end of the first side end and a first end of the second side end, and two ends of the fourth side end are respectively connected to a second end of the first side end and a second end of the second side end;

a third locking slot is disposed at the third side end, and the third locking slot penetrates a top of the third side end, so as to be connected to the first locking hook by means of locking; and a fourth locking slot is disposed at the fourth side end, and the fourth locking slot penetrates a top of the fourth side end, so as to be connected to the second locking hook by means of locking.

6. The access terminal box component according to claim 5, wherein:

both the third locking slot and the fourth locking slot are through slots; and when the first locking hook and the second locking hook are respectively connected to the third locking slot and the fourth locking slot by means of locking, the guiding part of the first locking hook and the guiding part of the second locking hook are respectively accommodated inside the third locking slot and the fourth locking slot, and the hooking part of the first locking hook and the hooking part of the second locking hook respectively pass through the third locking slot and the fourth locking slot and abut against the bottom of the mounting plate.

7. The access terminal box component according to claim 5, wherein:

both the third locking slot and the fourth locking slot are blind slots;

the third locking slot and the fourth locking slot respectively comprise an accommodating groove and an engaging groove that is connected to a bottom of the accommodating groove;

the accommodating groove penetrates the top of the mounting plate; and when the first locking hook and the second locking hook are respectively connected to the third locking slot and the fourth locking slot by means of locking, the guiding part of the first locking hook and the guiding part of the second locking hook are respectively accommodated inside the corresponding accommodating grooves, and the hooking part of the first locking hook and the hooking part of the second locking hook are respectively accommodated inside the corresponding engaging grooves and lock the corresponding engaging grooves.

8. The access terminal box component according to claim 6, wherein:

a first locking member is disposed at a position that is corresponding to the third locking slot and on the fiber optic terminal base, so as to be connected to the third locking slot by means of locking; and a second locking member is disposed at a position that is corresponding to the fourth locking slot and on the fiber optic terminal base, so as to be connected to the fourth locking slot by means of locking.

9. The access terminal box component according to claim 5, wherein:

a shape of the mounting plate is the same as a shape of the fiber optic terminal base, and the mounting plate and the fiber optic terminal base are symmetrical according to a same axis center.

10. The access terminal box component according to claim 1, wherein:

the access terminal box component further comprises a cover body;

the cover body is configured to cover the fiber optic terminal base;

the cover body comprises a first side wall and a second side wall that are arranged opposite to each other, wherein a first accommodating notch corresponding to the first pressing part is formed on the first side wall, and a second accommodating notch corresponding to the second pressing part is formed on the second side wall; and when the cover body covers the fiber optic terminal base, the first pressing part is accommodated inside the first accommodating notch, an end face of the first pressing part is exposed to the outside, the second pressing part is accommodated inside the second accommodating notch, and an end face of the second pressing part is exposed to the outside.

* * * * *